United States Patent Office 2,978,673
Patented Apr. 4, 1961

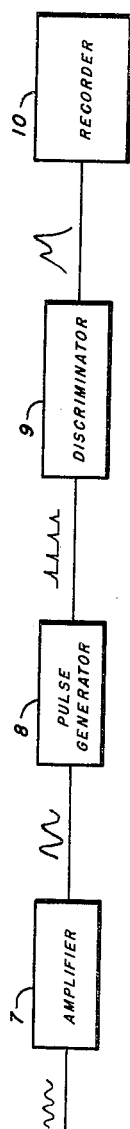
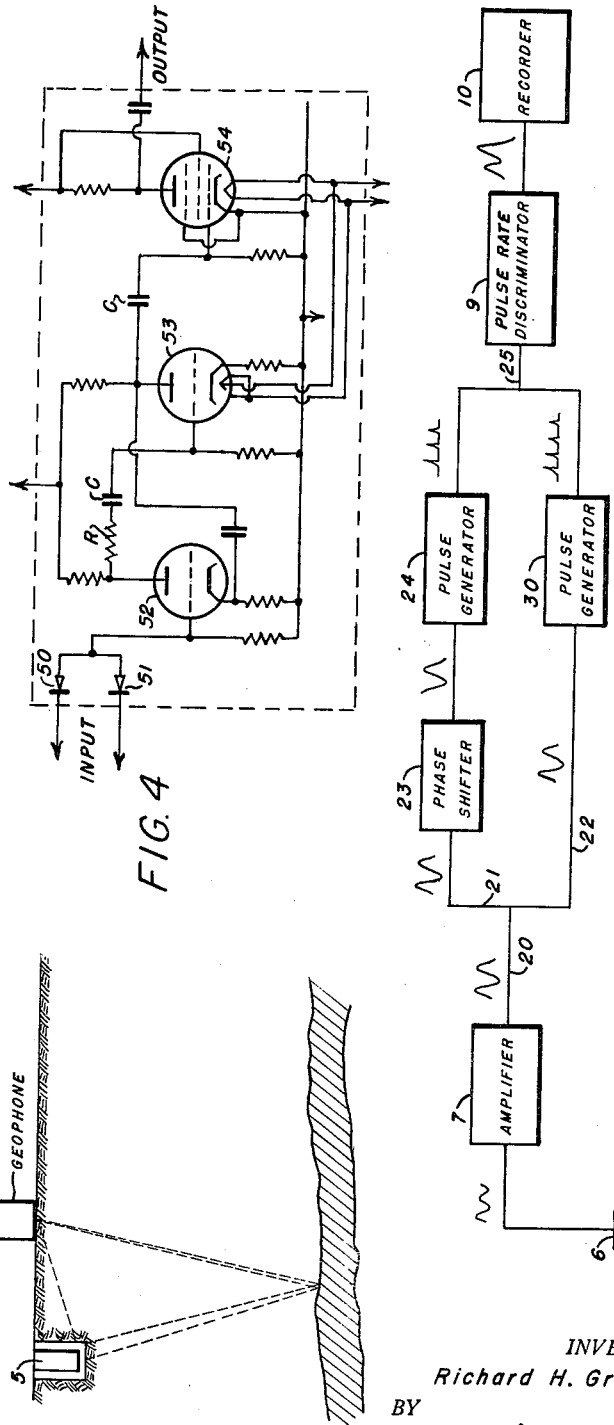

2,978,673

SEISMIC SURVEYING METHOD AND SYSTEM

Richard H. Graham, Wellesley, Mass., assignor, by mesne assignments, to Jersey Production Research Company, Tulsa, Okla., a corporation of Delaware Filed Feb. 21, 1955, Ser. No. 489,356

5 Claims. (Cl. 340—15)

This invention relates to a method and system for investigating subsurface formations. More particularly, this invention relates to a new and novel system and method of recording electrical signals generated by geophones utilized in seismic exploration.

It is a well-known physical principle that when an elastic wave is incident on the boundary surface between two media of different elastic properties, some of the wave energy is reflected. This principle of reflection has been utilized for some time in the exploration of subsurface formations. Current methods of recording reflected wave energy involve producing an electrical signal indicative of the character of the ground motion occasioned by the detonation of an explosive charge. Geophones are positioned at certain distances away from the source of the seismic waves and when the seismic wave energy impinges upon the geophones, the geophones produce electrical signals which are indicative of the character of the ground motions. These electrical signals oscillate about a no-signal, zero-voltage, or quiescent point.

The usual practice has been to examine the amplitude characteristics of the recordings made. Seismic computers, by correlating the amplitudes of a plurality of traces on a seismic record obtained by utilizing a plurality of geophones which are actuated by impinging seismic waves to produce a trace for each geophone, can obtain information as to the depth and dip of reflecting surfaces. It has been found, however, that the times at which the portion of the signal wave form due to reflected wave energy crosses the zero signal axis are relatively evenly spaced and somewhat closer spaced than the corresponding times of the other portions of the wave form. Therefore, if a record is obtained, which gives an indication of the space between the times the signal wave form received by the geophones crosses the zero signal axis and in addition indicates the amount of change of the space, such a record can be examined by a seismic computer and often may show the presence of reflecting surfaces more easily than is indicated by a conventional seismogram.

Throughout the description of my new method and system, the term "frequency" will be used often. It is to be understood that as used in the explanation of my new method and system, the term "frequency" refers to the number of times the signal wave form, received by the geophones, crosses the zero signal axis per unit of time.

It is an object, therefore, of my invention to provide a new system and method for subsurface exploration which depends upon the frequency of elastic waves generated by seismic disturbance.

Briefly described, my new method consists of creating a seismic disturbance which is detected by a detecting means and translated by said detecting means into electrical vibrations. The electrical vibrations are fed into a pulse generator which produces pulses, the quantity of which is proportional to the frequencies of the electrical vibrations. The pulses are then fed into a means for producing a voltage, which voltage depends upon the quantity of electrical pulses fed to it per unit of time. The voltages can be recorded or, if desired, indicated by means such as an oscillograph. From an examination of the record thus produced, the computer can determine reflections by ascertaining that part of the record which shows a relatively high frequency, which frequency remains constant for a period of time.

Other objects and a fuller understanding of the invention may be had by referring to the following description and claims taken in conjunction with the accompanying drawing in which Fig. 1 illustrates in block diagram an electronic system which can be utilized in the practice of my new method;

Fig. 2 shows in block diagram a modification of Fig. 1;

Fig. 4 is an electrical circuit diagram of a pulse generator which can be utilized in carrying out my new method of presenting seismic information.

Figure 3:
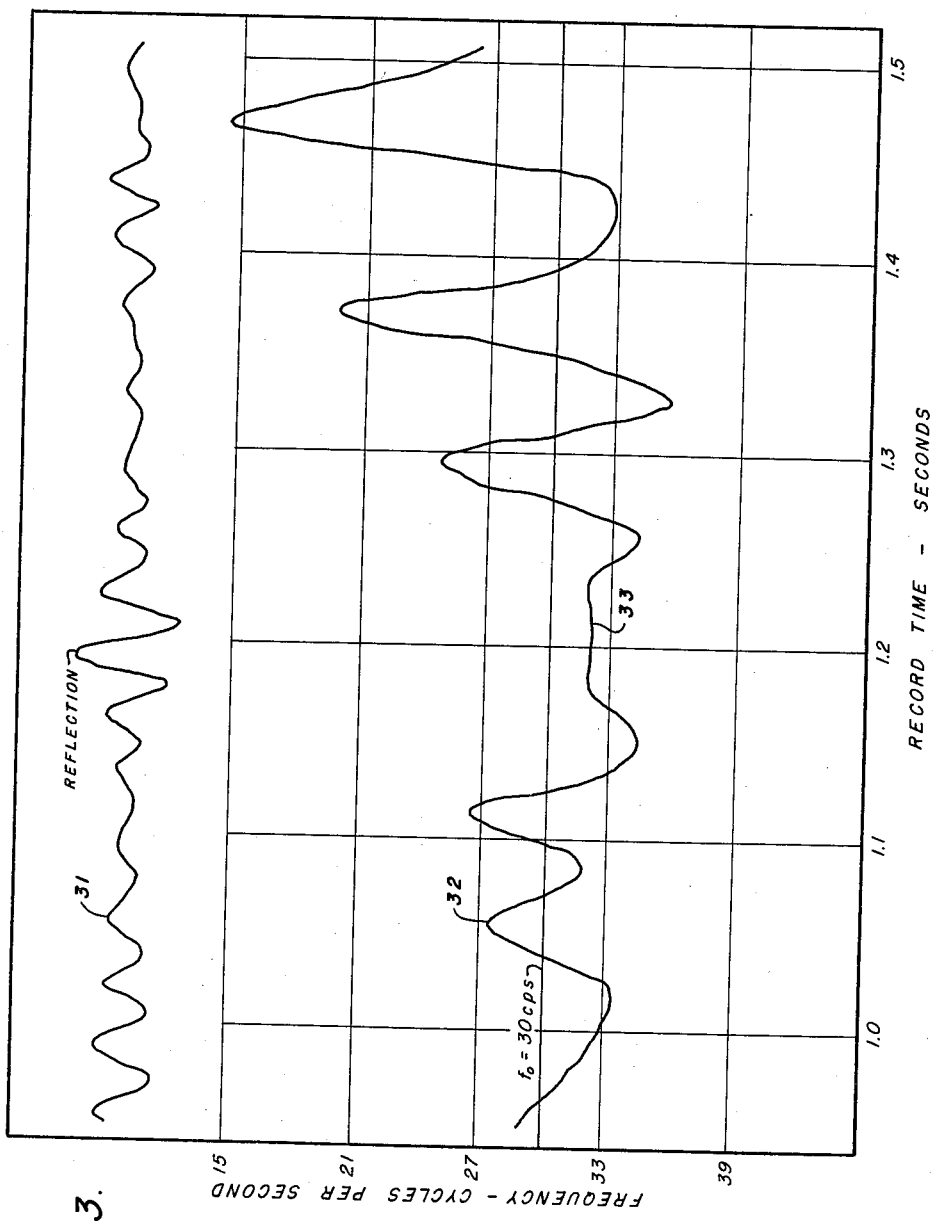
Fig. 3 shows in graphical form an original seismic trace and a voltage trace derived from the original seismic trace utilizing my new system and method.

Referring more particularly to the drawings, numeral 5 represents a means for creating seismic waves. This means may be a buried charge of dynamite, as shown in Fig. 1, which will set up seismic waves when exploded. As alternatives, the dynamite can be set off above the surface of the earth or the seismic waves can be created by other means such as an elevated weight which will produce the same effect when dropped on the earth. When the source of seismic waves is activated, the waves will be generated from the source and some of the waves will be reflected when they impinge upon a boundary surface between two media of different elastic properties. The direct and reflected seismic waves are "picked up" by means of a geophone 6. In Fig. 1, only one geophone 6 is shown and only one system for carrying out my new method is shown, but it is to be understood that a plurality of geophones may be utilized, if desired, with a complete electronic system being included with each geophone. The geophone 6 may be any type of geophone such as a velocity, acceleration or displacement type geophone or a pressure sensitive type of geophone. As is well known, a geophone has the property of generating electrical signals which duplicate electrically the character of the seismic waves. These generated electrical signals oscillate about a "zero" voltage axis.

As shown in Fig. 1, the electrical vibrations generated by geophone 6 are first amplified by amplifier 7 and then conducted to a pulse generator 8. The pulse generator 8 is adapted to produce pulses; the quantity of said pulses being proportional to the frequency of the generated electric vibrations. The pulses are produced each time the electric vibration crosses the zero voltage or quiescent line. Included in pulse generator 8 is a rectifier for making the pulses unidirectional. The higher the frequency of the electrical vibrations the more often the signal wave form will cross the zero voltage line per unit of time and hence the more often per unit of time a pulse will be generated by pulse generator 8. Fig. 4 shows an electrical circuit diagram of the pulse generator utilized in carrying out my new method. Pulse generators 8, 24 and 30 are substantially equivalent in their circuitry. To secure good timing accuracy, the input wave form is full-wave rectified by a pair of germanium diodes 50 and 51 to yield a wave form containing cusps or sharp points at the quiescent points of the input wave form. The negative output of the rectifier is applied to a first triode tube 52, operated as a high-gain voltage amplifier stage. Sufficiently large signals drive the triode tube 52 to a plate-current cut-off. A differentiating R–C coupling network applies the first derivative of the full-wave rectified wave form to the grid of a second triode tube 53, also operated as a high-gain voltage amplifier stage. A second differentiating circuit applies the second derivative of the full-wave rectified wave form to the grid of a gated-beam pentode tube 54 from the plate of which is obtained positive pulse output of constant amplitude and approximately one millisecond duration. The pulses from pulse generator 8 are conducted to a means for producing a voltage which is dependent in magnitude and polarity upon the quantity of pulses received per unit of time. This voltage generating means may take the form of a discriminator 9. One type of discriminator which can be used generates a voltage, the polarity of the voltage depending upon whether the time rate of the pulses is above or below a certain predetermined time rate ($f_0$) and the magnitude of the voltage being proportional to the amount the time rate varies above or below the predetermined time rate, $f_0$. The voltage generated by voltage generator means 9 is recorded by means of a recorder 10. The recorder 10 may be a recording oscillograph or any other type of recorder well known in the art for recording changes in voltage.

Under some circumstances, it may be desirable to produce a greater quantity of pulses per unit of time than produced by the generator 8 of Fig. 1. The system shown in Fig. 2 may be utilized if it is desired to double the number of pulses produced by pulse generator 8. As shown in Fig. 2, the amplified electric waves are conducted by means of conductor 20 to conductors 21 and 22. The circuit, including conductor 22, has a pulse generator 30 similar to the pulse generator 8 shown in Fig. 1. However, the electric signal conducted through conductor 21 passes through a phase shifter 23 and then through a pulse generator 24. The phase shifter 23 shifts the electric signal in phase. Hence pulse generator 24 will produce pulses the quantity of which will be the same as the pulses produced by pulse generator 30 but shifted in phase. The pulses produced by pulse generator 30 and the pulses produced by pulse generator 24 are conducted by means of conductor 25 to discriminator 9. This has the effect of doubling the frequency of the pulses generated as compared to the frequency of the pulses generated by the system of Fig. 1. The voltage generated by discriminator 9 is then recorded on recorder 10 and interpreted by the seismic computer.

Fig. 3 shows in graphical form an original seismic trace 31 and a trace 32 showing the voltage produced by discriminator 9 in response to the pulses generated by pulse generator 8. The abscissa represents time and the ordinate represents the frequency. It can be seen from an inspection of Fig. 3 that the portion of curve 32 indicated by numeral 33 is relatively high in frequency and the frequency does not change for a period of more than .05 second. Hence, this part of curve 32 clearly indicates the possibility of a reflection at this point.

In place of the discriminator described with regard to Figs. 1 and 2, alternative electronic devices, which can be utilized in my new system, may consist of an electronic counter which could be reset to zero by each succeeding pulse and the highest count reached simultaneously recorded. The electronic counter could be connected to an external high frequency source. Hence, the higher the count the farther apart the pulses are spaced. Also as a second alternative, a linear sawtooth voltage could likewise be utilized as a timing device by similarly triggering the sawtooth voltage by each successive pulse. The amplitude reached by the sawtooth voltage would be an analogue representation of the space between each pulse.

Although I have described my invention with a certain degree of particularity it is understood that the present disclosure has been made only by way of example and that numerous changes in the combination and arrangement of parts may be resorted to without departing from the spirit and the scope of the invention as hereinafter claimed.

I claim:
1. A system for presenting geophysical data comprising means for detecting and converting seismic energy into primary electrical signals, two parallel electrical systems connected to said detecting and converting means, one of said systems including a pulse generator adapted to produce pulses at the quiescent points of said primary signals, the other of said systems including a phase shifter adapted to receive said primary electrical signals and shift the phase thereof and a pulse generator adapted to receive said shifted primary electrical signals and produce a pulse at each of the quiescent points of said shifted primary signals, means for producing a voltage from the pulses produced by said two parallel electrical systems, the magnitude and polarity of which is dependent upon the quantity of said pulses per unit of time and means connected to said voltage-producing means for recording said voltage.

2. A system as recited in claim 1 in which the voltage-producing means comprises a discriminator.

3. A system for presenting geophysical data comprising means for detecting and converting seismic energy into primary electrical signals, means connected to said detecting and converting means for producing secondary electrical signals occuring in time only at the quiescent points of said primary electrical signals, means connected to said secondary electrical signal producing means for producing a voltage, the magnitude and polarity of which is dependent upon the quantity of said secondary electrical signals per unit of time and means electrically connected to said voltage-producing means for recording said voltage.

4. A system for presenting geophysical data comprising means for detecting and converting seismic energy into primary electrical signals, means connected to said detecting and converting means for producing electrical pulses occurring in time only at the quiescent points of said primary electrical signals, means electrically connected to said pulse producing means for producing a voltage the polarity of which is dependent upon the time rate of said pulses above and below a selected time rate and the magnitude of which is proportional to the amount the time rate varies above and below the selected time rate and means connected to the voltage producing means for recording the voltage.

5. A system for presenting geophysical data comprising means for detecting and converting seismic energy into primary electrical signals, means connected to said detecting and converting means for producing secondary electrical signals occurring in time only at the quiescent points on said primary electrical signals, means connected to said secondary electrical signal producing means for producing a voltage, the magnitude and polarity of which is dependent upon the quantity of said secondary electrical signals per unit of time and means electrically connected to said voltage-producing means for recording an indication representative of said voltage.

References Cited in the file of this patent

UNITED STATES PATENTS

| | | |
|---|---|---|
| 2,099,536 | Scherbatskoy | Nov. 16, 1937 |
| 2,261,321 | Williams | Nov. 4, 1941 |
| 2,395,289 | Neufeld | Feb. 19, 1946 |
| 2,621,249 | Ress | Dec. 9, 1952 |
| 2,649,503 | Adler | Aug. 18, 1953 |
| 2,767,388 | Rust | Oct. 16, 1956 |
| 2,791,288 | Meier | May 7, 1957 |